US006923267B1

(12) United States Patent
Bentley

(10) Patent No.: US 6,923,267 B1
(45) Date of Patent: Aug. 2, 2005

(54) LINEAR TURF AERATION APPARATUS

(75) Inventor: John A. Bentley, Manheim, PA (US)

(73) Assignee: ABC Groff, Inc., New Holland, PA (US)

( * ) Notice: Subject to any disclaimer, the term of this patent is extended or adjusted under 35 U.S.C. 154(b) by 70 days.

(21) Appl. No.: 10/737,031

(22) Filed: Dec. 16, 2003

Related U.S. Application Data
(60) Provisional application No. 60/434,510, filed on Dec. 18, 2002.

(51) Int. Cl.$^7$ .............................................. A01B 45/02
(52) U.S. Cl. ........................ 172/22; 172/554; 172/540; 172/29; 172/122
(58) Field of Search ................................ 172/540, 542, 172/552, 554, 21, 22, 29, 122, 133, 144, 174, 175

(56) References Cited

U.S. PATENT DOCUMENTS

| 4,723,607 | A | * | 2/1988 | Hansen | 172/22 |
| 5,437,335 | A | * | 8/1995 | Hines, Sr. | 172/22 |
| 5,469,922 | A | * | 11/1995 | Bjorge | 172/22 |
| 5,477,927 | A | * | 12/1995 | Figura | 172/29 |
| 5,524,711 | A | * | 6/1996 | Harris | 172/67 |
| 5,579,847 | A | * | 12/1996 | Postema | 172/22 |
| 5,623,996 | A | * | 4/1997 | Postema | 172/118 |
| 5,632,343 | A | * | 5/1997 | Gengler | 172/552 |
| 6,494,270 | B1 | * | 12/2002 | Lawson | 172/554 |
| 6,497,294 | B2 | * | 12/2002 | Vought | 172/122 |
| 6,554,078 | B1 | * | 4/2003 | McDonald | 172/69 |
| 6,681,868 | B2 | * | 1/2004 | Kovach et al. | 172/701 |
| 2003/0085044 | A1 | * | 5/2003 | McFarlane | 172/146 |

OTHER PUBLICATIONS
A Two page Sales Brochure for T155 Decompactor by Earth Quake Turfcare Ltd. (Unknown date).

* cited by examiner

Primary Examiner—Robert E. Pezzuto
Assistant Examiner—Alexandra Pechhold
(74) Attorney, Agent, or Firm—Miller Law Group, PLLC

(57) ABSTRACT

A linear aeration apparatus is operable to form parallel linear aeration trenches into the surface of the ground. Aeration of highly compacted turf areas can be accomplished by first spreading a top dressing material over the surface of the field and then forming linear aeration trenches into the surface of the ground mixing the soil removed from the trenches with the top dressing material. A reciprocating finishing apparatus brushes the mixed soil back into the aeration trenches to stabilize the surface of the ground. A rotary member has radially projecting blades that, upon rotation, form the continuous linear trenches defining unstable islands of earth therebetween. The finishing device includes rearwardly projecting fingers that reciprocate transversely to brush the mixed soil and top dressing material back into the formed aeration trenches to stabilize the islands of earth.

19 Claims, 8 Drawing Sheets

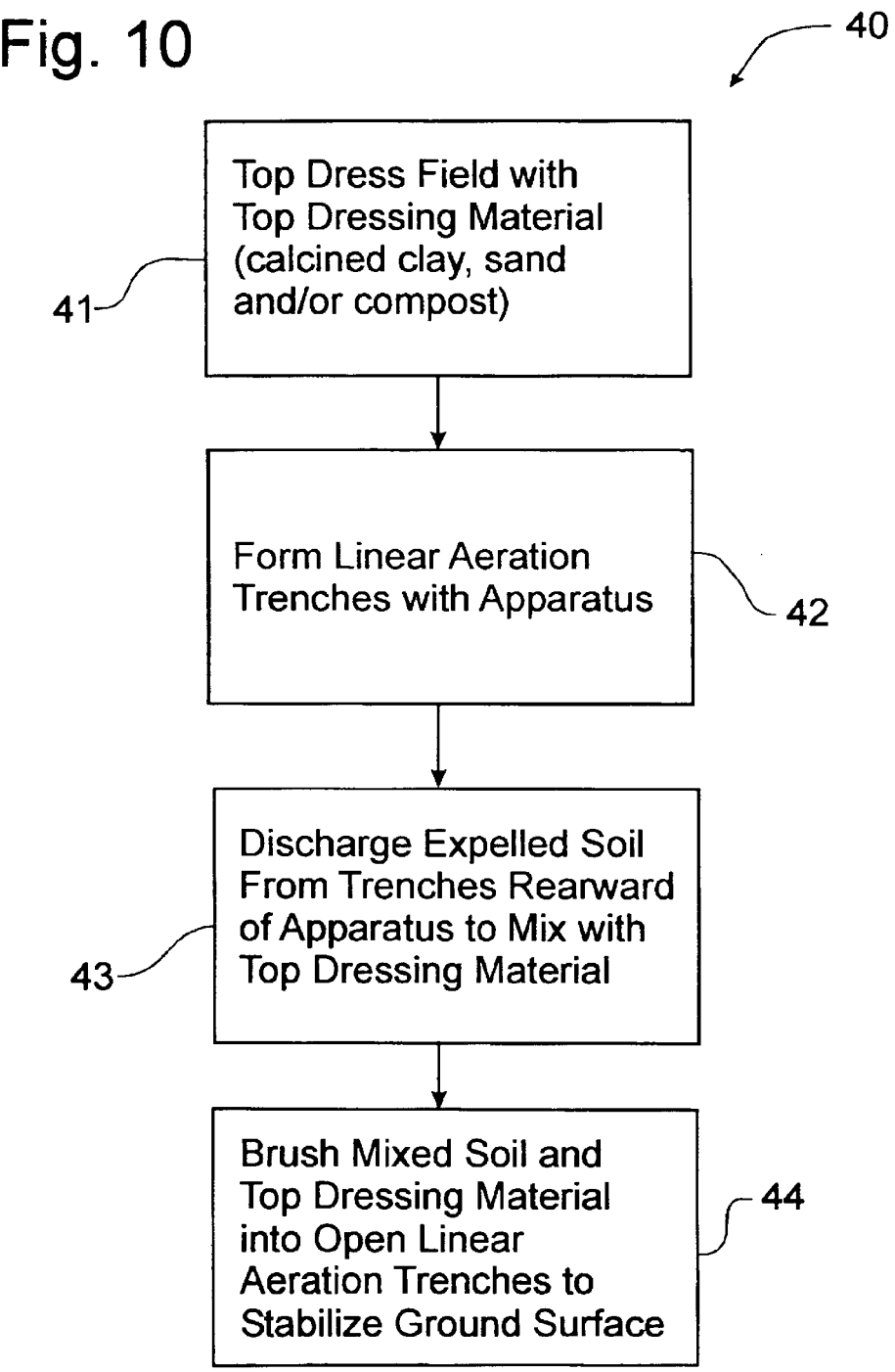

LINEAR TURF AERATION APPARATUS

CROSS-REFERENCE TO RELATED APPLICATIONS

This application claims domestic priority on U.S. Provisional Patent Application Ser. No. 60/434,510, filed Dec. 18, 2002, the contents of which are incorporated herein by reference.

BACKGROUND OF THE INVENTION

The present invention relates generally to turf aeration equipment used to loosen compacted soil by removing a portion of the soil therefrom and, more particularly, to an apparatus that provides for transversely spaced linear aeration trenches in conjunction with top dressing the turf to improve turf growth and drainage.

Aeration machines are well known in the art. These machines typically drive a hollow tine into the surface of the ground to create a plug of earth that is lifted from out of the ground above the surface and deposited on the surface of the ground. If the cores are to be disintegrated and swept back into the holes formed in the ground, the green cores, i.e. cores of earth freshly elevated from the moist ground, generally have to be dried for 2 to 4 hours, depending on the weather conditions, before the earthen portion can be removed from the vegetation thatch on top of the plug and associated root system. In some situations, such as golf course greens, it is preferable to return the earthen portion of the cores to the ground; however, the organic matter is typically removed from the aerated site. Alternatively, the earthen cores can be removed from the aerated site and taken to a remote location for subsequent handling.

For athletic fields, which often become highly compacted from extensive use, end of season aeration of the turf to enhance the growth of the grass is highly recommended. The process utilizing conventional hollow tine aerators is recommended to make multiple passes over the surface of the field to create enough open space within the turf to brush into the hollow spaces in the ground a calcined clay compound that is then top dressed over the field. Making multiple passes of an aeration machine takes a significant amount of time to accomplish and further causes compaction on the turf as the aeration process proceeds.

Accordingly, it would be desirable to provide a linear turf aeration apparatus that forms transversely spaced aeration trenches in the surface of the ground and then stabilizes the ground by sweeping non-compacted material back into the aeration trenches.

SUMMARY OF THE INVENTION

It is an object of this invention to overcome the aforementioned disadvantages of the known prior art by providing a linear aeration apparatus that forms transversely spaced, parallel aeration trenches to loosen the surface of the ground.

It is another object of this invention to provide an effective, yet inexpensive apparatus for aerating soil particularly on athletic fields.

It is an advantage of this invention that an extensive aeration can be effected on the surface of athletic fields.

It is a feature of this invention that the linear aeration apparatus is powered to effect a three-inch deep trench into the surface of the ground.

It is still another object of this invention to provide a finishing device that will be effective to brush mixed soil and top dress material back into the formed aeration trenches to stabilize the ground after passage of the linear aeration machine.

It is yet another object of this invention to provide a method of aerating athletic fields and other high use turf areas.

It is another feature of this invention that a top dressing material is deposited on top of the surface of the ground to be aerated before the aeration process.

It is another advantage of this invention that the soil removed from the aeration trench is mixed with the top dress material by the linear aeration machine to be swept back into the aeration trenches.

It is still another feature of this invention that the surface of the soil is stabilized by the filling of the linear aeration trenches with the top dressing material.

It is yet another advantage of this invention that drainage of athletic fields is improved by directing linear aeration trenches across the width of the field.

It is a further advantage of this invention that the aeration trenches can be oriented to control water flow with respect to the field.

It is a further feature of this invention that forming the aeration trenches transversely across an athletic field enhances the drainage of water off the crown of the field.

It is still a further feature of this invention that forming the aeration trenches longitudinally on an athletic field enhances the retention of water on the field.

It is still a further advantage of this invention that exceptional disruption of the turf on athletic fields and golf courses is attained when compared to conventional aeration methods using coring machines.

It is yet a further object of this invention to provide a method and apparatus for effectively aerating a turf area with a single pass of the aeration equipment.

It is yet a further advantage of this invention that subsequent passes over the field to break-up and/or remove aeration cores from the surface of the aerated ground is unnecessary.

It is still another advantage of this invention that the complete aeration process, including aeration and filling, can be accomplished in less time, thus saving in labor and operational expense.

It is a further object of this invention to provide a linear aeration apparatus that is durable in construction, inexpensive of manufacture, carefree of maintenance, facile in assemblage, and simple and effective in use.

These and other objects, features and advantages are accomplished according to the instant invention by providing a linear aeration apparatus that is operable to form parallel linear aeration trenches into the surface of the ground. Aeration of highly compacted turf areas can be accomplished by first spreading a top dressing material over the surface of the field and then forming linear aeration trenches into the surface of the ground mixing the soil removed from the trenches with the top dressing material. A reciprocating finishing apparatus brushes the mixed soil back into the aeration trenches to stabilize the surface of the ground. The aeration trenches are formed by a rotary member having radially projecting blades that upon rotation of the rotary member form continuous linear trenches that define unstable islands of earth therebetween. The finishing device includes rearwardly projecting fingers that reciprocate transversely to brush the mixed soil and top dressing material back into the formed aeration trenches to stabilize the islands of earth.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

FIG. 10 is a process flow diagram defining the aeration process for a representative athletic field.

DETAILED DESCRIPTION OF THE PREFERRED EMBODIMENT

Figure 1:
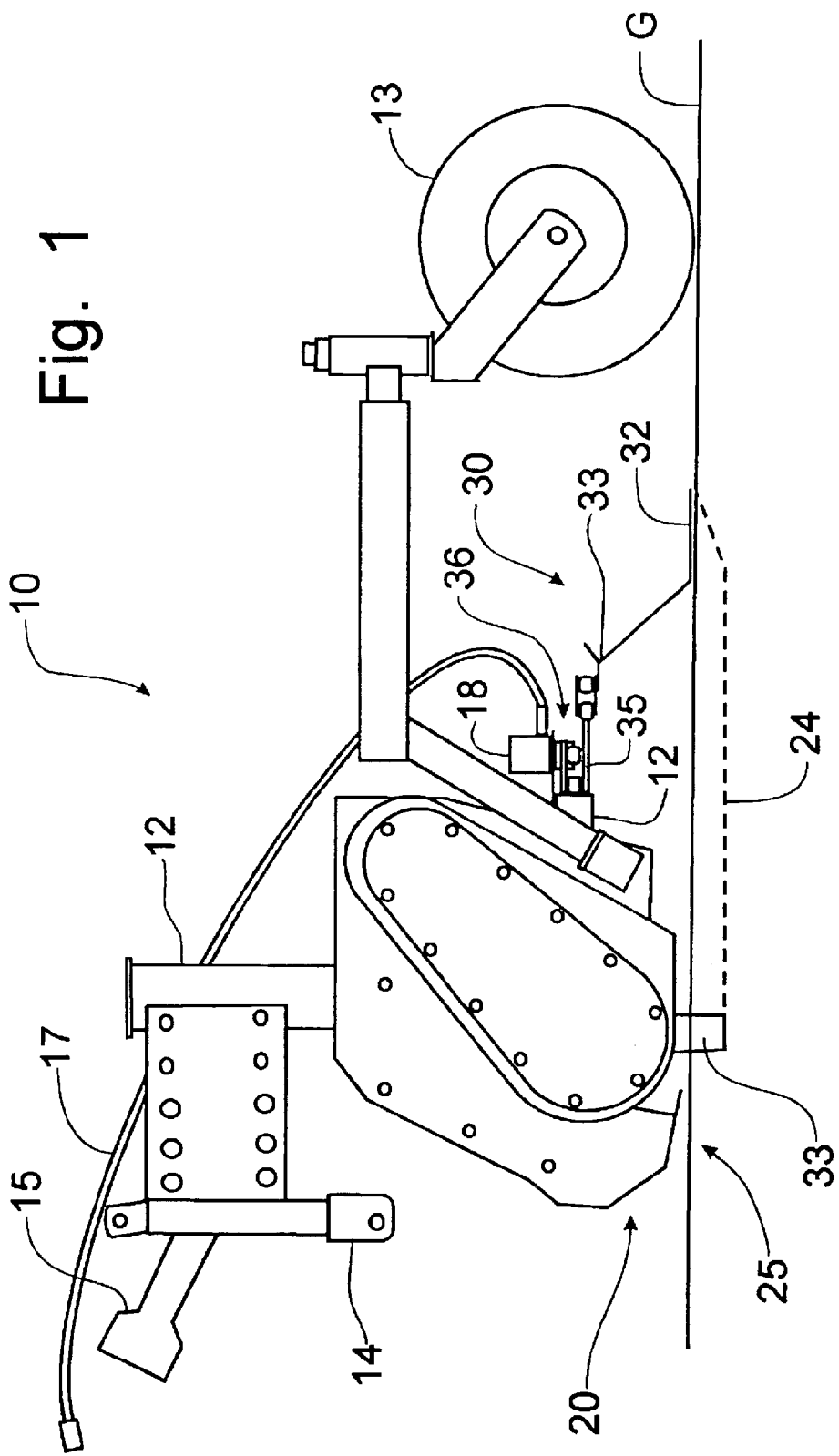
FIG. 1 is a schematic side elevational view of the linear aeration apparatus incorporating the principles of the instant invention.
Figure 2:
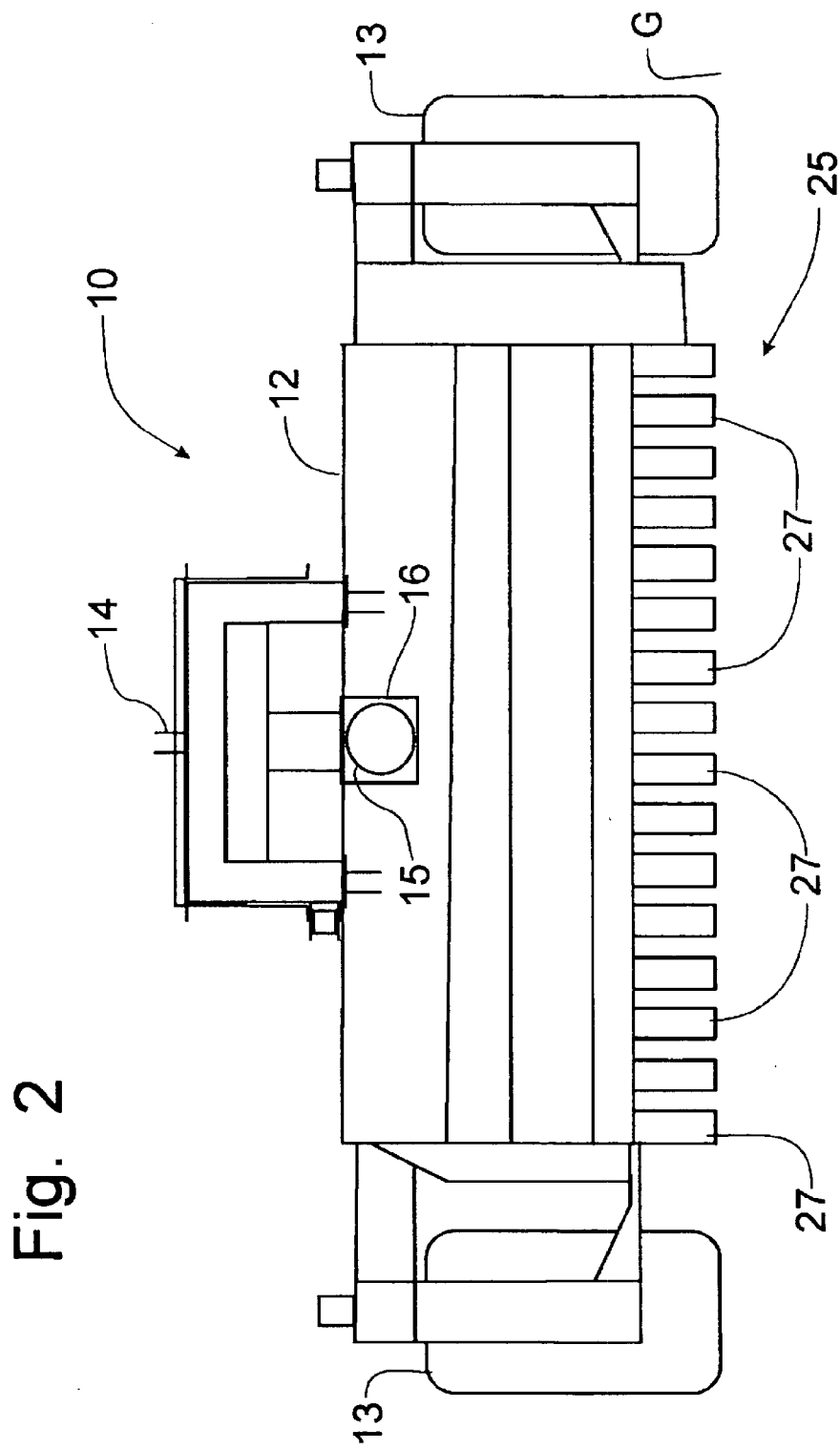
FIG. 2 is a schematic front elevational view of the linear aeration apparatus shown in FIG. 1.
Figure 3:
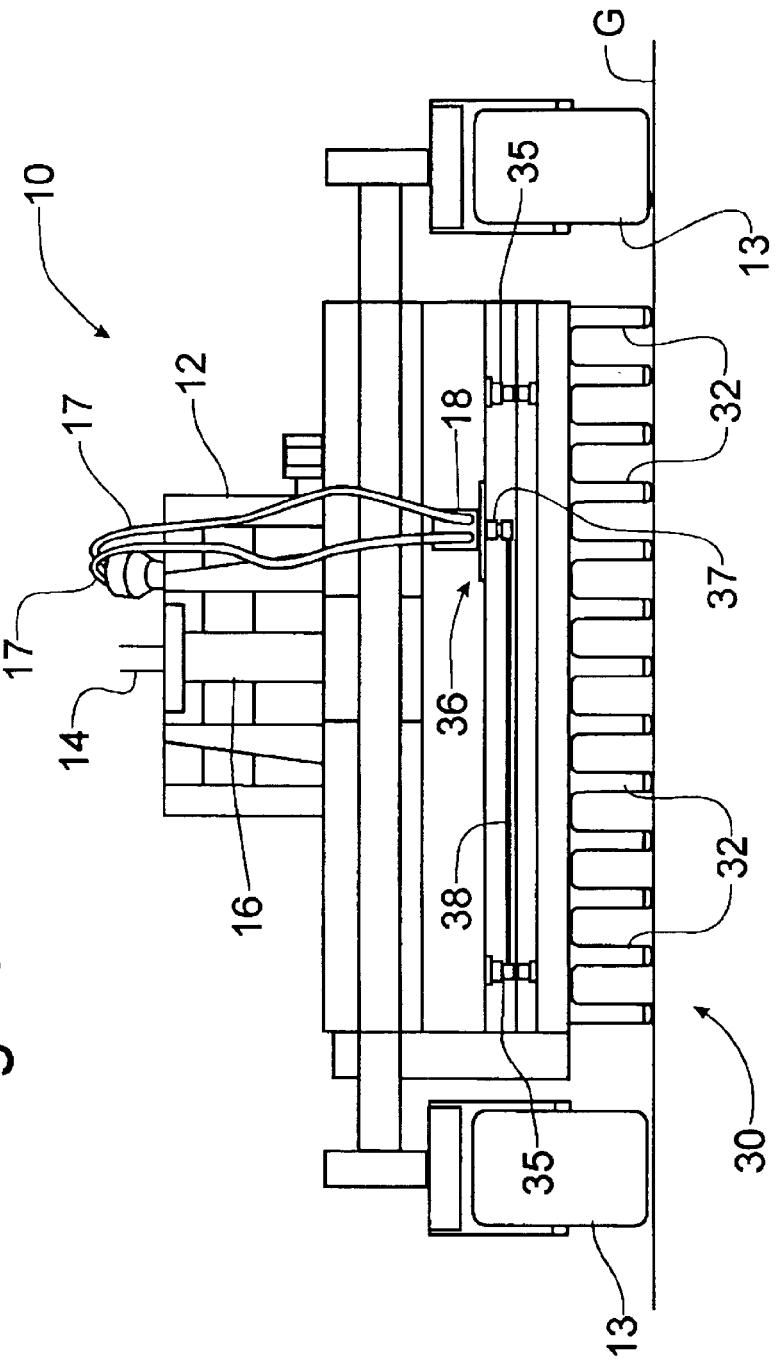
FIG. 3 is a schematic rear elevational view of the linear aeration apparatus shown in FIG. 1.
Figure 4:
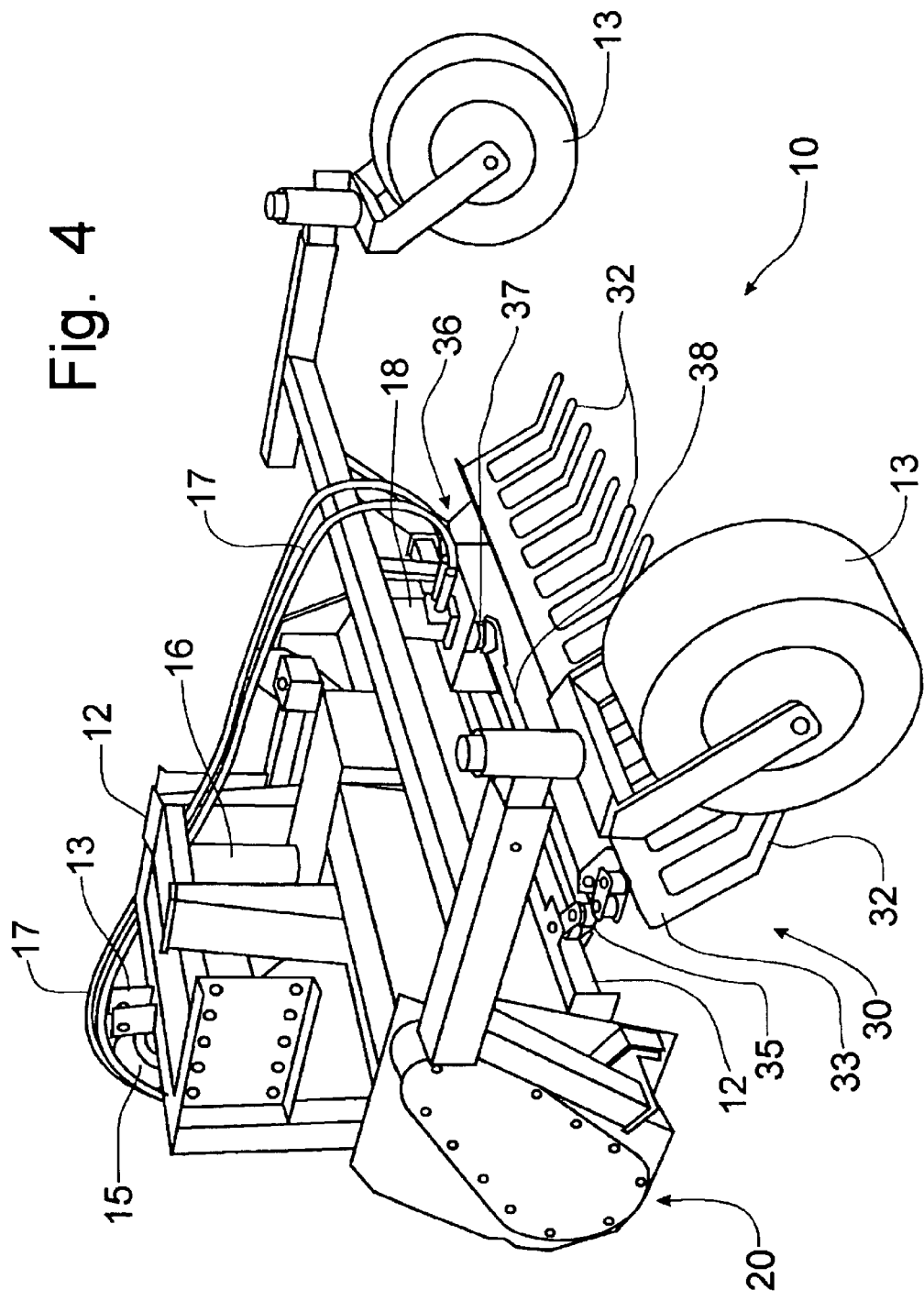
FIG. 4 is a left rear perspective view of the linear aeration apparatus.
Figure 5:
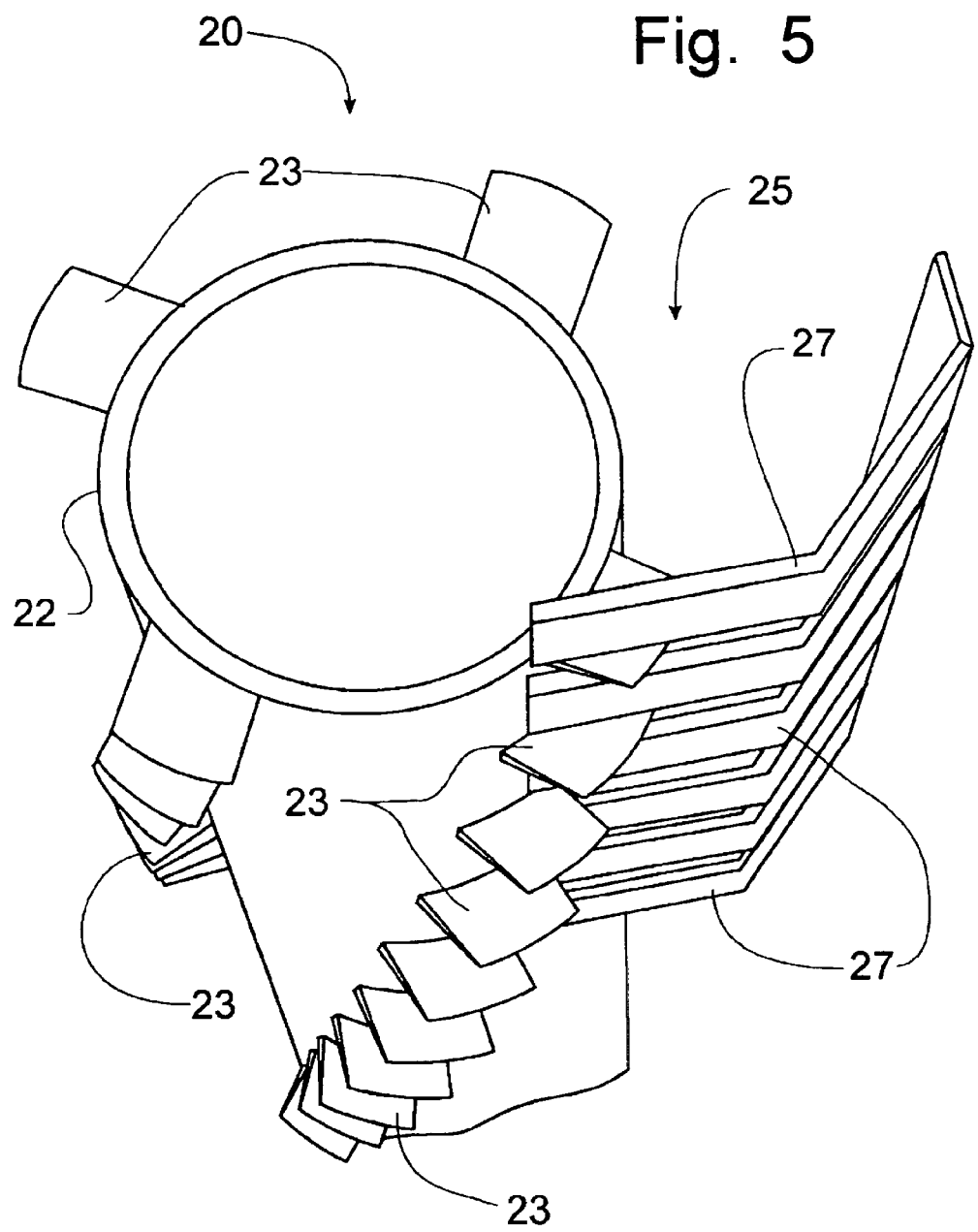
FIG. 5 is an enlarged partial perspective view of the rotary trench-forming member and the cooperable presser members.
Figure 6:
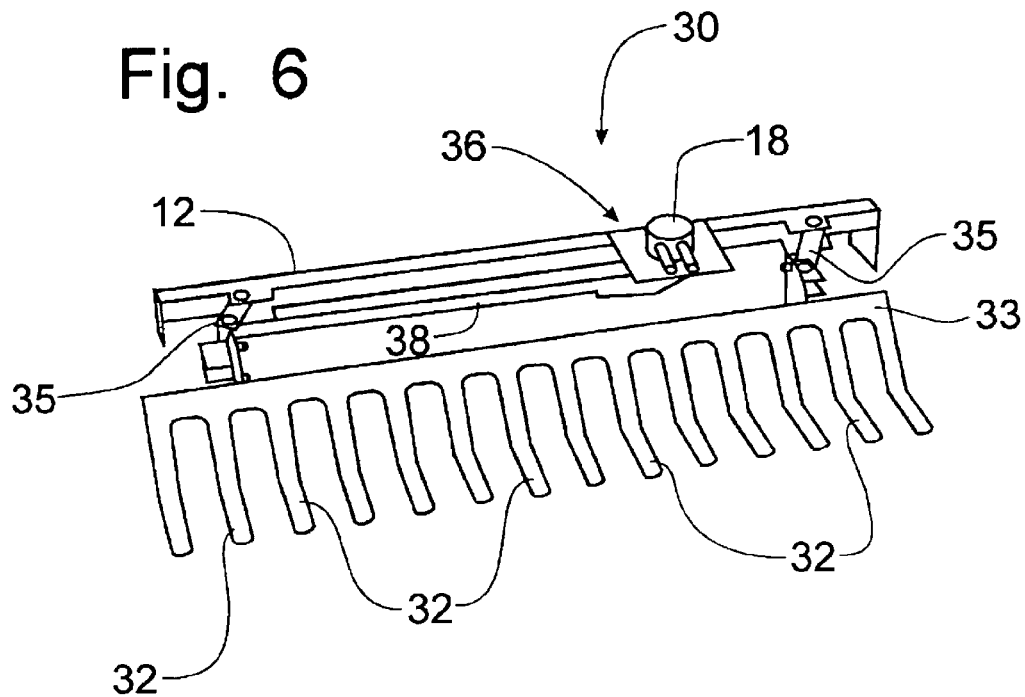
FIG. 6 is a schematic perspective view of the finishing device positioned behind the rotary trench-forming member.
Figure 7:
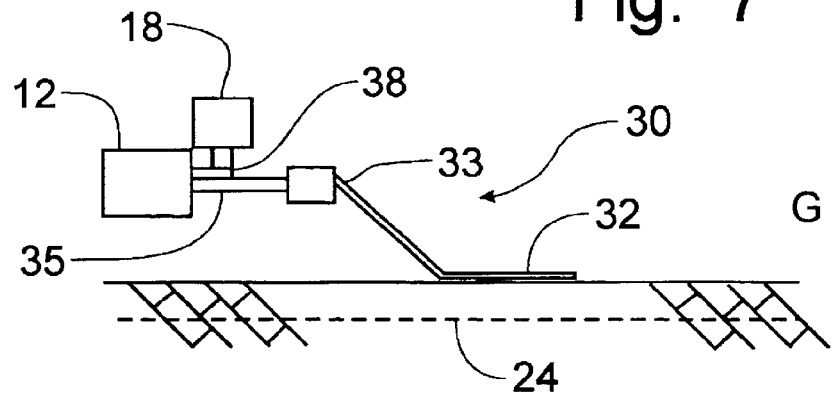
FIG. 7 is a schematic side elevational view of the finishing device depicted in FIG. 6 with the rearwardly extending fingers positioned adjacent the ground.
Figure 8:
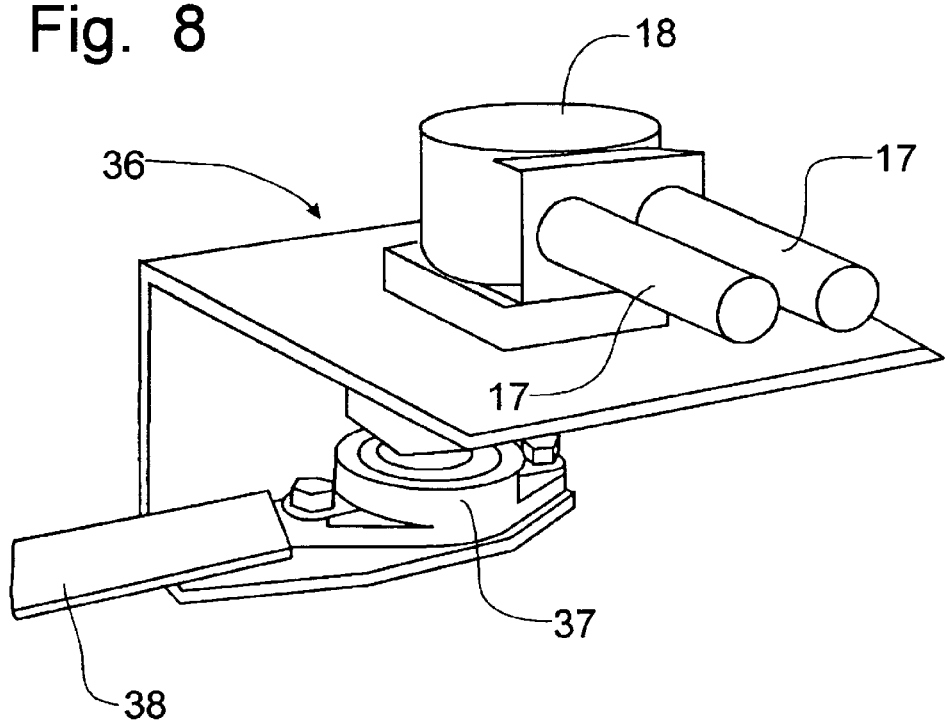
FIG. 8 is an enlarged perspective view of the eccentric drive for creating the transverse reciprocating movement for the finishing device.

Referring to FIGS. 1–4, a linear aeration apparatus incorporating the principles of the instant invention can best be seen. Any left and right references are used as a matter of convenience and are determined by standing at the rear of the machine facing toward the front hitch into the direction of travel. The linear aeration apparatus 10 includes a frame 12 having an attachment apparatus 14, such as a conventional three-point hitch apparatus, for connection to a prime mover, such as a tractor or a skid steer loader (not shown). The attachment apparatus 14 and a pair of transverse, trailing castor wheels 13 support the frame 12 for movement over the ground G.

The frame 12 supports drive mechanism 15 that is connectable to the prime mover (not shown) to transfer operational rotational power therefrom for driving the operable components of the apparatus 10, as described in greater detail below. The drive mechanism 15 can include a gearbox 16, or other appropriate power transfer devices to provide the operational power to the rotary member 20 for forming the linear aeration trenches. The drive mechanism 15 can also include hydraulic lines 17 that can connect to the prime mover to circulate hydraulic fluid under pressure to hydraulic devices on the apparatus 10, such as the hydraulic motor 18 for driving the reciprocating movement of the finishing device 30. One skilled in the art will recognize that all drive functions could be either mechanically or hydraulically accomplished.

As can be seen best in FIG. 1–5, the rotary trench-forming member 20 is rotatably supported in the frame 12 transversely to the direction of travel at a location adjacent to the surface of the ground G. The rotary trench-forming member 20 includes a plurality of individual blades 23 extending radially from a cylindrical drum 22. The blades 23 are preferably mounted in a spiral path around the periphery of the drum 22 so that the impact of the blades 23 with the ground G will be progressively spread across the transverse width of the drum 22. Preferably, four or five blades 23 are mounted on the drum 22 at each station along the transverse width of the rotary member 20 with each succeeding station having the blades 22 indexed around the circumference of the drum 22 to form the spiral paths or groupings of the blades 22. Preferably, the blades 23 are approximately one-half inch thick, i.e. the dimension extending parallel to the transverse width of rotary member 20, and approximately three inches long, i.e. the dimension extending radially from the drum 22.

The frame 12 also supports an assembly 25 of presser feet 27 spaced transversely in alignment with the blades 23 so that the blades 23 project between adjacent presser feet 27. The assembly 25 of presser members 27 is positioned forwardly of the rotary trench-forming member 20 and the presser feet 27 project rearwardly to the forward periphery of the drum 22. The rotary member 20 is driven to move the individual blades 23 forwardly through the presser members 27. Accordingly, the blades 23 first engage the ground rearwardly of the assembly 25 of presser feet 27 and are driven down and forwardly through the ground G to form a trench 24 (best seen in FIG. 9) approximately one-half inch wide and approximately three inches deep.

Figure 9:
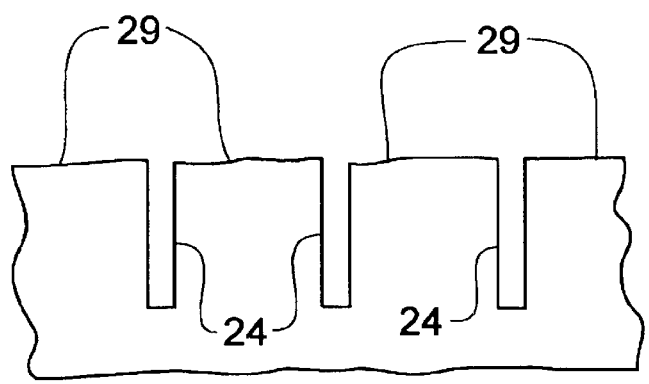
FIG. 9 is a partial cross-sectional representation of a section of the ground after the aeration trenches have been formed therein prior to being filled by the finishing device.

As the blades 23 exit the ground G forwardly of the axis of rotation of the drum 22, the blades 23 move between adjacent presser feet 27 and drive the expelled soil that was formerly located in the now formed aeration trench 24 upwardly and around the top of the drum 22 to be discharged rearwardly of the rotary member 20. The presser members 27 serve to hold down the areas of the soil adjacent the aeration trench 24 being formed, thus defining a discrete and clean aeration trench 24. Clearly, the sequential engagement of the aligned blades 23 at each station along the transverse width of the rotary trench-forming member 20 cooperate in the formation of a linearly extending aeration trench 24. As is best seen in FIG. 9, since the individual stations for the blades 23 are preferably spaced transversely approximately three and one-half inches from center to center, an island 29 of soil approximately three inches wide is flanked on opposing sides by an aeration trench 24 that is approximately three inches deep.

The process flow diagram of FIG. 10 reflects that the aeration process begins with a placement of a top dressing material, such as calcined clay, sand or compost, or a mixture of these materials, that is spread over the surface of the ground in a relatively thin layer of approximately one quarter to one-half inch thick. As the linear aeration apparatus 10 is passed over the surface of the ground and the rotary trench-forming member 20 forms the aeration trenches 24, the soil expelled from the trenches 24 is discharged rearwardly of the rotary member 20 on top of the top dressing still positioned on top of the islands 29 of soil. The operation of the trench-forming member 20 to throw the displaced material over the top of the rotary member 20 provides an aggressive action that effectively mixes the discharged soil and the top dressing material for subsequent engagement with a finishing device 30 described in greater detail below.

Referring now to FIGS. 1, 3, 4 and 6–8, the frame 12 also supports a trailing finishing device 30 that has a transverse width slightly greater than, or at least essentially the same width as the rotary trench-forming member 20. The function of the finishing device 30 is to brush the discharged soil and top dressing material into the just formed aeration trenches 24. A screen-like drag apparatus (not shown) and a rotary brush (not shown) were tried as finishing devices; however, the greatest success in performing the intended function for the finishing device 30 was obtained by a transversely reciprocating finger mechanism 30. The finishing device 30 is formed in a somewhat similar manner to the presser finger assembly 25 in that a plurality of rearwardly extending fingers 32 are positioned into engagement with the surface of the ground G. The fingers 32 are mounted to (or formed as part of) a transverse support bar 33 that is elevated above the ground. The support bar 33 is connected to the frame 12 by a pair of pivoted arms 35.

One of the arms 35 is operatively connected to a reciprocating drive mechanism 36 (best seen in FIG. 8), which is operatively powered by the rotating hydraulic motor 18. The drive mechanism 36 is preferably formed with an eccentric driver 37 that is directly rotated by the hydraulic motor 18 and causes a transversely reciprocating motion because the pivot center of the eccentric driver 37 is offset from the rotational axis of the hydraulic motor 18. A drive transfer link 38 interconnects the eccentric driver 37 and one of the pivoted arms 35 to transfer the reciprocating motion to the finishing device 30. As a result, the fingers 32 are rubbed transversely in a reciprocating manner over the surface of the ground G to both mix the discharged soil from the formed trenches 24 and the top dressing material 29 and to brush the mixed soil and top dressing material into the formed trenches 24 to fill them with this mixed material. The net result is that the surface of the ground is very unstable with three-inch islands 29 of soil surrounded by three-inch deep trenches 24. Any pressure, such as is found by a person walking on the ground would cause the islands 29 of soil to collapse into the adjacent trenches 24. The filling of the linear trenches 24 by the soil/top dressing mixture, stabilizes the islands 29 with non-compacted material allowing an encouragement of turf growth.

The process of effecting an aeration of ground, such as a compacted athletic field and the like, starts with the application of a top dressing material to the surface of the ground, as is reflected in step 41 of the process 40 depicted in the process diagram of FIG. 10. After a suitable layer of top dressing material is uniformly distributed on the surface of the ground, the linear aeration apparatus is run over the surface of the ground to first form linear aeration trenches 24, reflected in step 42, and then mixing the discharged soil and top dressing material in step 43 before brushing the mixed material into the formed trenches 24 to stabilize the islands 29. For athletic fields, the linear aeration trenches 24 can be formed across the crown of a typical athletic field to improve drainage to the sides of the field. The aeration trenches can also be formed longitudinally on the athletic field to enhance water retention on the field.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. A method of aerating an area of turf comprising the steps of:

first, applying a top dressing material to the surface of the area of turf to be aerated;

then, creating a series of linearly extending aeration trenches having islands of substantially undisturbed soil therebetween;

discharging native soil expelled from said aeration trenches to the ground; and stabilizing said islands of soil by brushing soil and top dressing material into said aeration trenches, such that said soil and top dressing material within said aeration trenches has a lower density than said islands of soil between said aeration trenches.

2. The method of aerating of claim 1 further comprising the step of:

mixing said native soil and said top dressing material for brushing into said aeration trenches.

3. The method of aerating of claim 2 further comprising the step of:

providing a linear aerating apparatus for creating said linear aerating trenches, said linear aerating apparatus including a trench-forming member that rotates to move soil and top dressing material displaced from said aeration trenches over top of said trench-forming member to effect said mixing step.

4. The method of aerating of claim 3 wherein said linear aeration machine includes a finishing device that is operable to mix said native soil and top dressing material displaced from said aeration trenches with said top dressing material already located on the surface of the ground and to brush the mixed native soil and top dressing material into said aeration trenches.

5. The method of aerating of claim 4 wherein said mixing and brushing steps are accomplished by the step of:

transversely reciprocating said finishing apparatus over the surface of the ground.

6. The method of aerating of claim 5 wherein said top dressing material comprises one or more of calcined clay, sand and compost.

7. The method of aerating of claim 6 wherein said aerating trenches have a depth approximately equal to a corresponding transverse width of the adjacent island of soil measured generally perpendicularly to said aerating trench.

8. A method of aerating an athletic field comprising the steps of:

applying a layer of top dressing material to the surface of said athletic field;

rotating a rotary trench-forming member having radially extending blades to form a series of generally linearly extending aeration trenches having substantially undisturbed islands of soil between adjacent aeration trenches, said rotary trench-forming member retaining said aeration trenches in a trench-like configuration substantially as originally formed with discrete said islands of soil therebetween;

mixing said top dressing material with soil expelled from said aeration trenches; and brushing soil and top dressing material into said aeration trenches to stabilize the islands of soil between adjacent said aeration trenches without substantial deformation of said islands of soil between said aeration trenches.

9. The method of aerating of claim 8 wherein said mixing step includes the step of:

discharging said material expelled from said aeration trenches over top of said rotary trench-forming member to be deposited on the ground rearwardly of said rotary trench-forming member to be mixed further with said top dressing material on said islands of soil.

10. The method of aerating of claim 9 wherein the blades on said rotating trench-forming member form said aeration trenches to a depth approximately equal to a corresponding width of said adjacent island of soil.

11. The method of aerating of claim 9 wherein said brushing step includes the step of transversely reciprocating a finishing device having a series of transversely spaced fingers positioned adjacent the surface of the ground.

12. The method of aerating of claim 11 further comprising the step of:
 restraining the surface of the ground with presser feet engaging the ground adjacent the movement of said blades through the soil to create said aeration trenches.

13. The method of aerating of claim 10 further comprising the step of:
 providing a linear aeration apparatus having a frame rotatably supporting said rotary trench-forming member and support said finishing device for transverse reciprocating movement rearwardly of said rotary trench-forming member.

14. A method of aerating a turf field comprising the steps of:
 applying a layer of top dressing material to the surface of said athletic field;
 rotating a rotary trench-forming member having radially extending blades to form a series of generally linearly extending aeration trenches having islands of soil between adjacent aeration trenches;
 mixing said top dressing material with soil expelled from said aeration trenches by discharging said material expelled from said aeration trenches over top of said rotary trench-forming member to be deposited on the ground rearwardly of said rotary trench-forming member to be mixed further with said top dressing material on said islands of soil; and
 brushing soil and top dressing material into said aeration trenches to stabilize the islands of soil between adjacent said aeration trenches.

15. The method of aerating of claim 14 wherein said rotary trench-forming member is part of a linear aerating machine for creating said linearly extending aerating trenches, and said linear aeration machine includes a finishing device that is operable to mix said native soil and top dressing material displaced from said aeration trenches with said top dressing material already located on the surface of the ground and to brush the mixed native soil and top dressing material into said aeration trenches.

16. The method of aerating of claim 15 wherein said mixing and brushing steps are accomplished by the step of:
 transversely reciprocating said finishing apparatus over the surface of the ground, said finishing apparatus having a series of transversely spaced fingers positioned adjacent the surface of the ground.

17. The method of aerating of Claim 14 further comprising the step of:
 restraining the surface of the ground with presser feet engaging the ground adjacent the movement of said blades through the soil to create said aeration trenches.

18. The method of aerating of claim 14 wherein said top dressing material comprises one or more of calcined clay, sand and compost.

19. The method of aerating of claim 14 wherein the blades on said rotating trench-forming member form said aeration trenches to a depth approximately equal to a corresponding width of said adjacent island of soil.

* * * * *